US012592186B2

(12) United States Patent
Chen

(10) Patent No.: US 12,592,186 B2
(45) Date of Patent: Mar. 31, 2026

(54) DISPLAY DEVICE AND DISPLAY APPARATUS

(71) Applicant: Wuhan China Star Optoelectronics Semiconductor Display Technology Co., Ltd., Wuhan (CN)

(72) Inventor: Qi Chen, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 18/251,237

(22) PCT Filed: Apr. 21, 2023

(86) PCT No.: PCT/CN2023/089817
§ 371 (c)(1),
(2) Date: Apr. 30, 2023

(87) PCT Pub. No.: WO2024/198016
PCT Pub. Date: Oct. 3, 2024

(65) Prior Publication Data
US 2024/0331624 A1 Oct. 3, 2024

(30) Foreign Application Priority Data
Mar. 28, 2023 (CN) ......................... 202310317479.0

(51) Int. Cl.
*G09G 3/3208* (2016.01)
*G09G 3/00* (2006.01)

(52) U.S. Cl.
CPC ............. *G09G 3/3208* (2013.01); *G09G 3/03* (2020.08)

(58) Field of Classification Search
CPC ............................... G09G 3/03; G09G 3/3208
See application file for complete search history.

(56) References Cited

U.S. PATENT DOCUMENTS

2012/0049718 A1* 3/2012 Watanabe ......... G02F 1/133526 313/110
2017/0082784 A1* 3/2017 Niu ..................... H04M 1/0266
(Continued)

FOREIGN PATENT DOCUMENTS

CN 204087706 U 1/2015
CN 105321429 A 2/2016
(Continued)

OTHER PUBLICATIONS

International Search Report in International application No. PCT/CN2023/089817, mailed on Oct. 23, 2023.
(Continued)

*Primary Examiner* — Priyank J Shah
(74) *Attorney, Agent, or Firm* — Nathan & Associates Patent Agents Ltd.; Menachem Nathan

(57) ABSTRACT

A display device and a display apparatus are provided by the present disclosure. A curved portion of the cover plate of the display device includes a first point, when a first virtual normal line perpendicular to a surface of the curved portion where the first point is located extends toward a display area, the first virtual normal line does not intersect with the light-shielding portion adjacent to the first point and intersects with the display area. Therefore, a non-display area is capable of having a same forward light output as the display area, allowing users to experience a narrower border or even borderless visual experience when viewing the display device.

15 Claims, 7 Drawing Sheets

(56) References Cited

U.S. PATENT DOCUMENTS

| | | | | |
|---|---|---|---|---|
| 2020/0185654 | A1* | 6/2020 | Luo | G06F 3/0443 |
| 2020/0201115 | A1* | 6/2020 | Ko | G02F 1/133526 |
| 2022/0334293 | A1* | 10/2022 | Baek | G02B 5/003 |

FOREIGN PATENT DOCUMENTS

| | | | |
|---|---|---|---|
| CN | 115224073 | A | 10/2022 |
| CN | 115240551 | A | 10/2022 |
| JP | 2020095146 | A | 6/2020 |
| KR | 1020140125632 | A | 10/2014 |
| KR | 1020210024374 | A | 3/2021 |
| KR | 1020210086029 | A | 7/2021 |

OTHER PUBLICATIONS

Written Opinion of the International Search Authority in International application No. PCT/CN2023/089817, mailed on Oct. 23, 2023.

Korean Office Action issued in corresponding Korean Patent Application No. 10-2023-7039514 dated Dec. 13, 2024, pp. 1-7.

* cited by examiner

DISPLAY DEVICE AND DISPLAY APPARATUS

TECHNICAL FIELD

The present disclosure relates to the field of display technologies, and particularly relates to a display device and a display apparatus.

BACKGROUND

Organic Light Emitting Diode (OLED) display devices are widely used owing to their high brightness, wide viewing angle, fast response speed, ultra-thin thickness, light weight, and flexibility.

With continuous development of OLED display device technologies, the OLED display devices are widely used in various scenes of life. Consumers and researchers not only pursue high-performance display devices, but also gradually increase their demand for device appearance and visual experience. Among them, comprehensive screens, narrow borders, etc. have become hot topics of concern. However, due to complex circuit design at edges of the display devices, there may always be a certain range of non-display areas at the edges of the display devices, making it difficult to achieve a full-screen display.

SUMMARY

Embodiments of the present disclosure provide a display device to solve a technical problem that a display panel of prior art is uncapable of achieve borderless full-screen design.

Technical Solutions

To solve the above problem, technical solutions provided by the present disclosure are as followings:

A display device is provided by an embodiment of the present disclosure, the display device includes a display area and a non-display area disposed on at least one side of the display area, and the display device includes:

a substrate;

a light-emitting layer disposed on a side of the substrate, the light-emitting layer including a plurality of light-emitting pixels corresponding to the display area;

a light-shielding layer disposed on a side of the light-emitting layer away from the substrate, the light-shielding layer including a light-shielding portion at least corresponding to the non-display area; and a cover plate disposed on a side of the light-shielding layer away from the substrate, the cover plate including a curved portion at least corresponding to the non-display area.

A surface of the curved portion includes a first point, when a first virtual normal line defined as perpendicular to a surface of a curved portion where the first point is located extends toward the display area, the first virtual normal line does not intersect with the light-shielding portion adjacent to the first point and intersects with the display area.

In some embodiments of the present disclosure, the surface of the curved portion includes a second point, when a second virtual normal line defined as perpendicular to a surface of a curved portion where the second point is located extends toward the display area, the second virtual normal line does not intersect with the light-shielding portion adjacent to the second point and intersects with the display area, and the first point is closer to the display area compared to the second point.

In some embodiments of the present disclosure, the curved portion corresponding to the first point is provided with a first curvature radius, the curved portion corresponding to the second point is provided with a second curvature radius, and the first curvature radius is less than the second curvature radius.

In some embodiments of the present disclosure, a first distance is defined from the first point to an adjacent boundary of the display area, a second distance is defined from a boundary of the curved portion where the first point is located and away from the display area to the adjacent boundary of the display area, and a ratio between the first distance and the second distance ranges from one-third to one-half.

In some embodiments of the present disclosure, the surface of the curved portion includes a third point, when a third virtual normal line defined as perpendicular to a surface of a curved portion where the third point is located extends toward the display area, the third virtual normal line intersects with a boundary of the light-shielding portion adjacent to the third point and close to the display area, and intersects with the display area; and the first point is closer to the display area compared to the third point.

In some embodiments of the present disclosure, a side of the cover plate away from the display area includes a right angle portion and a corner cutting portion, the corner cutting portion is disposed between the curved portion and the light-emitting layer, the right angle portion is disposed between the corner cutting portion and the curved portion, one boundary of the corner cutting portion is aligned with a boundary of the light-shielding portion away from the display area, another boundary of the corner cutting portion is aligned with a boundary of the right angle portion, and the boundary of the right angle portion is aligned with a boundary of the curved portion away from the display area.

In some embodiments of the present disclosure, a thickness of the curved portion is greater than a thickness of the right angle portion, and the thickness of the right angle portion is greater than a thickness of the corner cutting portion.

In some embodiments of the present disclosure, the display device comprises an adhesive layer which is disposed between the light-emitting layer and the cover plate, a refractive index of the adhesive layer is lower than a refractive index of the cover plate, and the refractive index of the cover plate ranges from 1.5 to 2.

In some embodiments of the present disclosure, the curved portion includes a first portion close to the display area and a second portion away from the display area, a boundary between the first portion and the second portion passes through the first point and is parallel to a boundary of the curved portion close to the display area, and a ratio of a surface area of the first portion to a surface area of the curved portion ranges from one-third to one-half.

In some embodiments of the present disclosure, a cross-sectional shape of the cover plate comprises a trapezoidal shape.

In addition, a display apparatus is provided by an embodiment of the present disclosure, the display apparatus includes a display device and an electronic component, the display device includes a display area and a non-display area disposed on at least one side of the display area, and the display device includes:

a substrate;

a light-emitting layer disposed on a side of the substrate, the light-emitting layer including a plurality of light-emitting pixels corresponding to the display area;

a light-shielding layer disposed on a side of the light-emitting layer away from the substrate, the light-shielding layer including a light-shielding portion at least corresponding to the non-display area; and a cover plate disposed on a side of the light-shielding layer away from the substrate, the cover plate including a curved portion at least corresponding to the non-display area.

A surface of the curved portion includes a first point, when a first virtual normal line defined as perpendicular to a surface of a curved portion where the first point is located extends toward the display area, the first virtual normal line does not intersect with the light-shielding portion adjacent to the first point and intersects with the display area.

In some embodiments of the present disclosure, the surface of the curved portion includes a second point, when a second virtual normal line defined as perpendicular to a surface of a curved portion where the second point is located extends toward the display area, the second virtual normal line does not intersect with the light-shielding portion adjacent to the second point and intersects with the display area, and the first point is closer to the display area compared to the second point.

In some embodiments of the present disclosure, the curved portion corresponding to the first point is provided with a first curvature radius, the curved portion corresponding to the second point is provided with a second curvature radius, and the first curvature radius is less than the second curvature radius.

In some embodiments of the present disclosure, a first distance is defined from the first point to an adjacent boundary of the display area, a second distance is defined from a boundary of the curved portion where the first point is located and away from the display area to the adjacent boundary of the display area, and a ratio between the first distance and the second distance ranges from one-third to one-half.

In some embodiments of the present disclosure, the surface of the curved portion includes a third point, when a third virtual normal line defined as perpendicular to a surface of a curved portion where the third point is located extends toward the display area, the third virtual normal line intersects with a boundary of the light-shielding portion adjacent to the third point and close to the display area, and intersects with the display area; and the first point is closer to the display area compared to the third point.

In some embodiments of the present disclosure, a side of the cover plate away from the display area includes a right angle portion and a corner cutting portion, the corner cutting portion is disposed between the curved portion and the light-emitting layer, the right angle portion is disposed between the corner cutting portion and the curved portion, one boundary of the corner cutting portion is aligned with a boundary of the light-shielding portion away from the display area, another boundary of the corner cutting portion is aligned with a boundary of the right angle portion, and the boundary of the right angle portion is aligned with a boundary of the curved portion away from the display area.

In some embodiments of the present disclosure, a thickness of the curved portion is greater than a thickness of the right angle portion, and the thickness of the right angle portion is greater than a thickness of the corner cutting portion.

In some embodiments of the present disclosure, the display device comprises an adhesive layer which is disposed between the light-emitting layer and the cover plate, a refractive index of the adhesive layer is lower than a refractive index of the cover plate, and the refractive index of the cover plate ranges from 1.5 to 2.

In some embodiments of the present disclosure, the curved portion includes a first portion close to the display area and a second portion away from the display area, a boundary between the first portion and the second portion passes through the first point and is parallel to a boundary of the curved portion close to the display area, and a ratio of a surface area of the first portion to a surface area of the curved portion ranges from one-third to one-half.

In some embodiments of the present disclosure, a cross-sectional shape of the cover plate comprises a trapezoidal shape.

Beneficial Effects

The display device and the display apparatus are provided by the embodiments of the present disclosure. The display device includes the display area and the non-display area disposed on at least one side of the display area, the display device further includes the substrate, the light-emitting layer, the light-shielding layer, and the cover plate. The light-emitting layer is disposed on one side of the substrate and includes the plurality of light-emitting pixels corresponding to the display area. The light-shielding layer is disposed on the side of the light-emitting layer away from the substrate and includes the light-shielding portion at least corresponding to the non-display area. The cover plate is disposed on the side of the light shielding layer away from the substrate and includes at least a curved portion corresponding to the non-display area. The surface of the curved portion includes the first point, when the first virtual normal line perpendicular to the surface of the curved portion where the first point is located extends toward the display area, the first virtual normal line does not intersect with the light-shielding portion adjacent to the first point and intersects with the display area, therefore, when light emitted by a luminous pixel located between the first virtual normal line and the light-shielding portion adjacent to the first virtual normal passes through the first point, the light emitted by the luminous pixel may deflect towards the display area, making the non-display area have a same forward light output as the display area, which allows users to have a reduced or even borderless visual experience when facing the display device.

DETAILED DESCRIPTION OF EMBODIMENTS

The technical solutions in the embodiments of the present disclosure will be described clearly and completely hereafter with reference to the accompanying drawings. Apparently, the described embodiments are only a part of but not all embodiments of the present disclosure. All other embodiments obtained by persons of ordinary skill in the art based on the embodiments of the present disclosure without creative efforts shall fall within the protection scope of the present disclosure.

The embodiments of the present disclosure aim at the technical problem that display devices of the prior art cannot realize a borderless full-screen design, and a display device and a display apparatus are provided by the embodiments of the present disclosure to alleviate the above technical problem.

Figure 1:
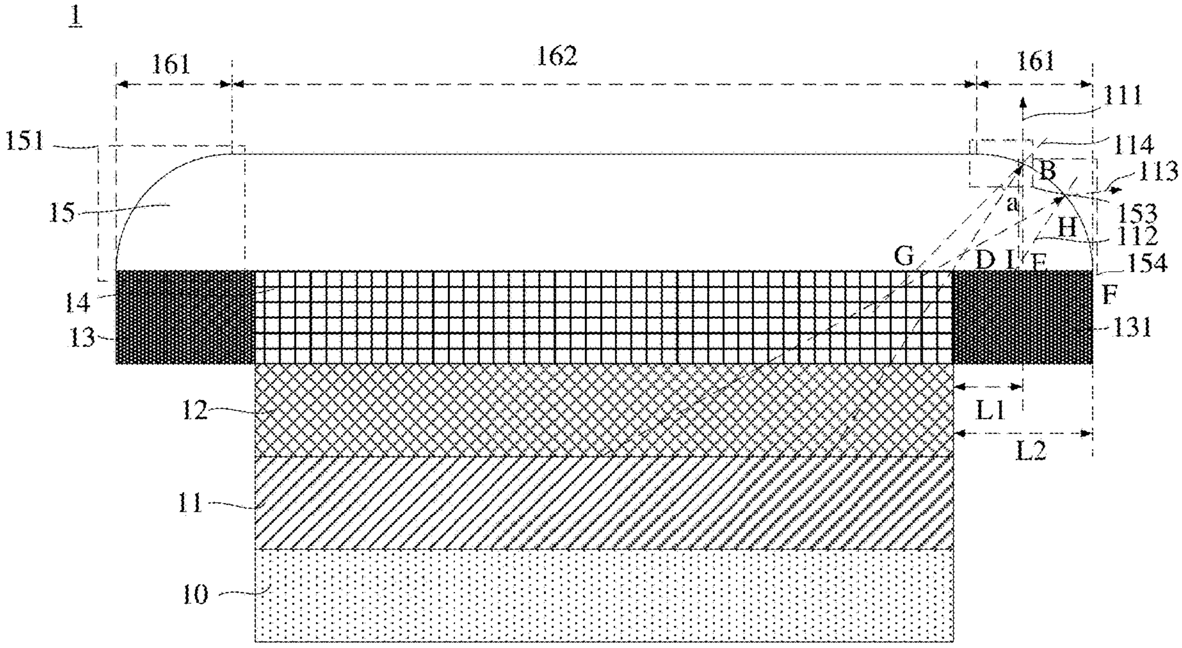
FIG. 1 is a first schematic view of a display device provided by an embodiment of the present disclosure.
Figure 2:
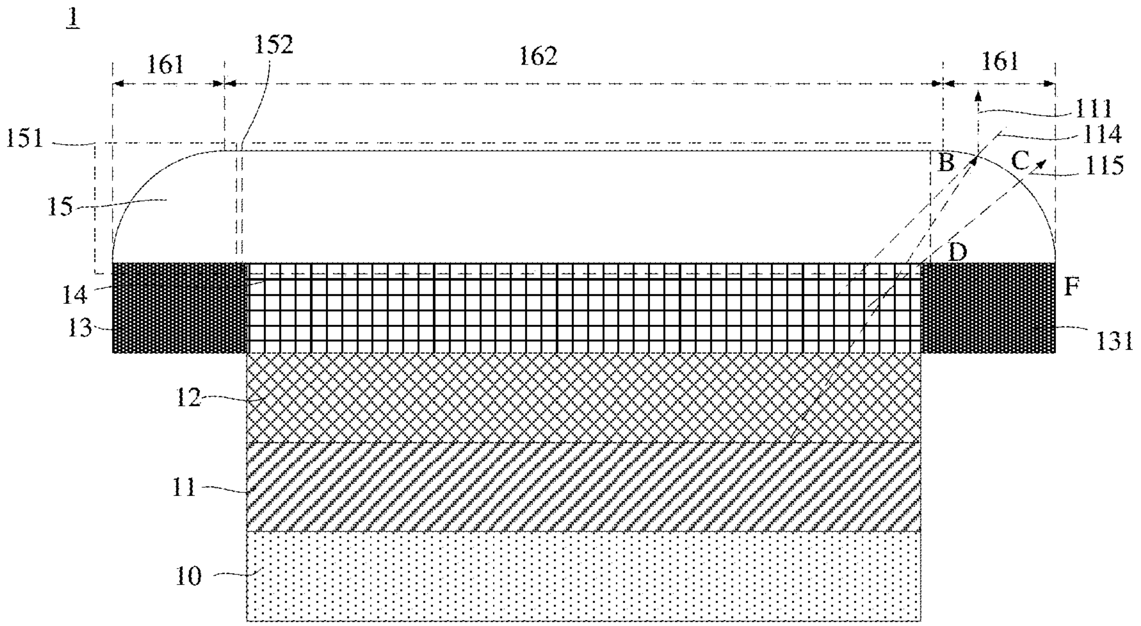
FIG. 2 is a second schematic view of the display device provided by an embodiment of the present disclosure.

Referring to FIGS. 1 and 2, the display device is provided by the embodiments of the present disclosure, and the display device 1 includes a display area 162 and a non-display area 161 disposed on at least one side of the display area. The display device 1 further includes:

a substrate 10;

a light-emitting layer 11 disposed on a side of the substrate, the light-emitting layer 11 including a plurality of light-emitting pixels corresponding to the display area 162;

a light-shielding layer 13 disposed on a side of the light-emitting layer 11 away from the substrate 10, the light-shielding layer 13 including a light-shielding portion 131 at least corresponding to the non-display area 161; and a cover plate 15 disposed on a side of the light-shielding layer 13 away from the substrate 10, the cover plate 15 including a curved portion 151 at least corresponding to the non-display area 161;

A surface of the curved portion 151 includes a first point B, when a first virtual normal line 114 defined as perpendicular to a surface of the curved portion 151 where the first point B is located extends toward the display area 162, the first virtual normal line 114 does not intersect with the light-shielding portion 131 adjacent to the first point B and intersects with the display area 162.

The display device is provided by the embodiments of the present disclosure, and the curved portion 151 of the cover plate 15 includes the first point, when the first virtual normal line perpendicular to the surface of the curved portion 151 where the first point is located extends toward the display area, the first virtual normal line does not intersect with the light-shielding portion adjacent to the first point and intersects with the display area. Therefore, when light emitted by a luminous pixel located between the first virtual normal line 114 and the light-shielding portion adjacent to the first virtual normal line passes through the first point B, the light emitted by the luminous pixel may deflect towards the display area (entering from a high refractive index material into a low refractive index material), making the non-display area have a same forward light output as the display area, which allows users to have a border reduced or even borderless visual experience when facing the display device. If the first virtual normal line corresponding to the first point B intersects with its adjacent light-shielding portion, the above luminous pixel located between the first virtual normal line and the light-shielding portion is uncapable emitting light to the first point B, and thus the forward light is uncapable of being emitted and a borderless visual effect is uncapable of being achieved.

It should be noted that, referring to FIG. 1, the curved portions 151 are two curved portions which are disposed symmetrically. Therefore, the curved portion 151 is marked on a left side of FIG. 1, and a design of the curved portion 151 is specified on a right side of FIG. 1. It should be understood that a number of points of the curved portions 151 on both sides of the cover plate may be same or different. FIG. 1 illustrates an arrangement that the curved portions 151 on both sides of the cover plate are disposed symmetrically as an example.

It should be noted that in FIG. 1, the light-shielding layer 13 includes two light-shielding portion 131 located on both sides of the display device 1 as an example for illustration. When the first point is located on the curved portion on the right side, the light-shielding portion adjacent to the first point refers to a light-shielding portion on the right side. When the first point is located on the curved portion on the left side, the light-shielding portion adjacent to the first point refers to a light-shielding portion on the left side.

In an embodiment, referring to FIG. 1, the surface of the curved portion 151 further includes a second point H, when a second virtual normal line 112 defined as perpendicular to a surface of the curved portion 151 where the second point H is located extends toward the display area 162, the second virtual normal line 112 intersects with the light-shielding portion 131 adjacent to the second point H. The first point B is closer to the display area 162 compared to the second point H. By setting the second point on the curved portion, when the second virtual normal line perpendicular to the surface of the curved portion where the second point is located extends toward the display area, the second virtual normal line intersects with the light-shielding portion adjacent to the second point, and the first point is closer to the display area compared to the second point, so that when the light emitted by the luminous pixel located between the second virtual normal line and the light-shielding portion away from the second virtual normal line pass through the second point H, the light of the emitted by the luminous pixel may diverge towards a side surface of the non-display area, making sure that there is light emitted from both a front and side areas corresponding to the light-shielding layer in the display device, so that when facing the display device in the front or side view angels, users could achieve a visual experience with narrower or even borderless borders.

In an embodiment, the curved portion corresponding to the first point is provided with a first curvature radius, the curved portion corresponding to the second point is provided with a second curvature radius, and the first curvature radius is less than the second curvature radius. By making the first curvature radius of the curved portion corresponding to the first point less than the second curvature radius of the curved portion corresponding to the second point, the light is capable of being emitted from the front area of the non-display area of the display device when the light reaches the curved portion corresponding to the first point. When the light reaches the curved portion corresponding to the second point, the light is capable of being emitted from the side area of the non-display area of the display device, to make sure that there is light emission in both the front and side areas corresponding to the light-shielding portion in the display device, so that when viewing the display device in the front or side directions, users could achieve the experience with narrower or borderless borders.

Specifically, referring to FIG. 1, for example, a part of the curved portion 151 corresponding to the first point B is defined as a first curved portion 153, and a part of the curved portion 151 corresponding to the second point H is defined as a second curved portion 154. The curved portion 151 includes the first curved portion 153 and the second curved portion 154. The first curved portion 153 includes the first point B, and the second curved portion 154 includes the second point H. A curvature radius of the first curved portion 153 is less than a curvature radius of the second curved portion 154. By making the curvature radius of the first curved portion less than the curvature radius of the second curved portion, the light is capable of being emitted from the front of the non-display area of the display device when it is irradiated to the first curved portion, and the light is capable of being emitted from the side area of the non-display area of the display device when it is irradiated to the second curved portion. The light is emitted from both the front and side areas corresponding to the light-shielding layer in the display device, so that when viewing the display device in the front or side directions, users could achieve the experience with narrower or borderless borders.

Specifically, a point D is a point on a boundary where the light-shielding portion is close to the display area, while a point F is a point on a boundary where the light-shielding portion is away from the display area. Taking a difference in radians between the first and second curved portions of the curved portion as an example for explanation, referring to FIG. 1, it could be obtained that in the embodiment of the present disclosure, a junction point G between the first virtual normal line 114 and a lower side of the cover plate does not intersect with the light-shielding portion adjacent to the first point B and intersects with the display area 162, and the first virtual normal line 114 corresponds to a light 111 passing through the first curved portion 153. That is, a normal line corresponding to a light passing through a point D and a point B is located on a side of the point D away from the point F, so that the light 111 passing through the first curved portion 153 is capable of being emitted from the front area of the display device. A junction point I between the second virtual normal line 112 and the lower side of the cover plate intersects with the light-shielding portion 131 adjacent to the second point H, and the second virtual normal line 112 corresponds to a light 113 passing through the second curved portion 154, so that the light 113 passing through the second curved portion 154 is capable of being emitted from the side area of the display device, making sure there is light emission in both the front and side areas corresponding to the light-shielding layer in the display device. So that when viewing the display device in the front or side view angel, users could achieve the experience with narrower or borderless borders.

Regarding the technical problem of a low side view brightness resulting in the inability to achieve a borderless side view. In an embodiment, referring to FIG. 1, an arc length of the first curved portion 153 is less than or equal to an arc length of the second curved portion 154, that is, in the non-display area, an arc length of a part of the curved portion 151 including the first point is less than an arc length of a part of the curved portion 151 including the second point. By making an arc length of a part of the curved portion 151 including the first point is less than an arc length of a part of the curved portion 151 including the second point, the light emitted from the front area of the cover plate is capable of achieving a borderless visual effect of the front view angle. Moreover, if the more light is emitted to the second curved portion, the more light is emitted to the side area of the cover plate. So that when viewing the display device, the borderless visual effect could also be achieved at the side view angle.

Specifically, by adjusting the arc length of the first curved portion and the arc length of the second curved portion, an amount of light emitted from the front and side area of the cover plate could be adjusted, so as to adjust a light output intensity of the front and side area of the cover plate. Furthermore, considering that there may be some light emitted from the display area at the curved portion of the cover plate, it is possible to make the arc length of the first curved portion less than or equal to the arc length of the second curved portion, resulting in a higher light intensity in the side area of the cover plate, achieving a borderless visual effect when viewed in front or side view.

Taking the arc length of the first curved portion less than or equal to the arc length of the second curved portion as an example, detailed explanations are provided by the above embodiments, but the embodiments of the present disclosure are not limited to this. For example, in order to improve the light intensity of the front view angle of the curved area of the cover plate, the arc length of the first curved portion could be greater than the arc length of the second curved portion.

In an embodiment, referring to FIG. 1, there is a first distance L1 between the first point B and an adjacent boundary of the display area 162. There is a second distance L2 between a boundary of the curved portion 151 away from the display area 162 and an adjacent boundary of the display area 162, and the curved portion 151 is where the first point B is located. A ratio between the first distance L1 and the second distance L2 ranges from one-third to one-half. By making the distance between the first point and the adjacent boundary of the display area range from one-third to one-half of the distance between the two boundaries of the curved portion, in an area corresponding to the light-shielding portion, more light is emitted to the side of the display device than to the front of the display device, thereby improving the brightness of the side view angle of the display device, and avoiding a lower brightness of the front view angle resulted by the low amount of light emitted into the front area of the cover plate, which balances the front and side view brightness of an edge area of the display device, achieving a borderless visual effect at different view angles.

Specifically, the second distance may be a width of the curved portion where the first point is located, that is, L2 may be a width of the curved portion 151 where the first point B is located.

Specifically, referring to FIG. 1, drawing a perpendicular line BE passing through the first point B towards a contact surface between the light-shielding portion 131 and the cover plate 15, the first distance between the first point B and the adjacent boundary of the display area 162 is defined as a distance from a point D to a point E, and the second distance between the boundary of the curved portion 151 having the first point B and away from the display area 162, and the adjacent boundary of the display area 162, is a distance of the point D to a point F.

In an embodiment, the curved portion includes a first portion close to the display area and a second portion away from the display area. A boundary between the first portion and the second portion passes through the first point and is parallel to the boundary of the curved portion close to the display area. A ratio of a surface area of the first portion to a surface area of the curved portion ranges from one-third to one-half. By passing the boundary of the first portion through the first point, the ratio of the surface area of the first portion and the surface area of the curved portion ranging from one-third to one-half, in the area corresponding to the light-shielding portion 131, the light emitted to the side area of the display device is equal to or more than the light emitted to the front area of the display device, thereby improving the brightness of the side view angle of the display device, and avoiding the lower brightness of the front view angle resulted by the low amount of light emitted into the front area of the cover plate, which balances the front and side view brightness of the edge area of the display device, achieving a borderless visual effect at different view angles.

In an embodiment, referring to FIGS. 1 and 2, the surface of the curved portion 151 further includes a third point C. When a third virtual normal line 115 perpendicular to a surface of the curved portion 151 where the third point C is located extends toward the display area 162, the third virtual normal line 115 intersects with a boundary of the light-shielding portion 131 adjacent to the third point C and close to the display area 162, and intersects with the display area 162.

The first point B is closer to the display area compared to the third point C. By setting a third point on the curved portion, when the third virtual normal line perpendicular to the surface of the curved portion where the third point is located extends toward the display area, the third virtual normal line intersects with the boundary of the light-shielding portion 131 adjacent to the third point and close to the display area, and intersects with the display area, and the first point B is closer to the display area compared to the third point C. So that light passing through the third virtual normal line could be emitted from the side of the display panel, making sure that both the front and side areas of corresponding to the light-shielding layer in the display device emit light, so that when viewing the display device in the front or side view angel, users could achieve the experience with narrower or borderless borders.

Specifically, taking it as an example that the curved portion includes the first point and the second point, and the curved portion includes the first point and the third point, the above embodiments provides a detailed explanation, but the embodiments of the present disclosure are not limited to this. For example, the curved portion may include the first point, the second point and the third point, a part located to a left side of the third point of the curved portion includes the first point, and a part located to a right side of the third point of the curved portion includes the second point, which may makes sure that both the front and side areas corresponding to light-shielding layer in the display device emit light, so that when viewing the display device in the front or side view angel, users could achieve the experience with narrower or borderless borders.

Regarding the technical problem of light loss caused by interface total reflection between the cover plate and an adhesive layer, in an embodiment, referring to FIG. 1, the display device 1 further includes an adhesive layer 14 which is disposed between the light-emitting layer 11 and the cover plate 15. A refractive index of the adhesive layer 14 is lower than that of the cover plate 15. By making the refractive index of the adhesive layer lower than that of the cover plate, the total reflection of light at the interface between the cover plate and the adhesive layer is reduced, a power consumption of the display device is reduced, and the brightness of the display device is improved.

Specifically, the refractive index of the cover plate ranges from 1.5 to 2. By adjusting the refractive index of the cover plate ranging from 1.5 to 2, and combining the refractive index of the cover plate with the refractive index of the air and the adhesive layer, light is allowed to be emitted outside the display device without being limited to the display device, reducing light loss and costs.

In an embodiment, referring to FIG. 1, an incidence angle of the light passing through the curved portion 151 in the display panel 11 ranges from 0 degrees to 40 degrees, and the refractive index of the cover plate ranges from 1.5 to 2. By adjusting the incident angle of the light passing through the curved portion 151 ranging from 0 degrees to 40 degrees, and correspondingly adjusting the refractive index of the cover plate ranging from 1.5 to 2, the refractive index of the cover plate may be matched with the refractive index of the air and adhesive layer, allowing the light to be emitted outside the display device without being limited to the display device, reducing light loss and costs.

In an embodiment, referring to FIG. 2, the cover plate 15 further includes a flat portion 152 located between the curved portions 151, and a width of the flat portion 152 is greater than a width of the curved portion 151. When the cover plate includes the flat portion and the curved portion, and the width of the flat portion is greater than the width of the curved portion, the flat portion may achieve borderless display and improve a screen proportion of the display device, and by designing the curvature radius of the curved portion of the cover plate, the borderless display effect may also be achieved at the edge area of the display device, thereby achieving borderless display of the display device.

Figure 3:
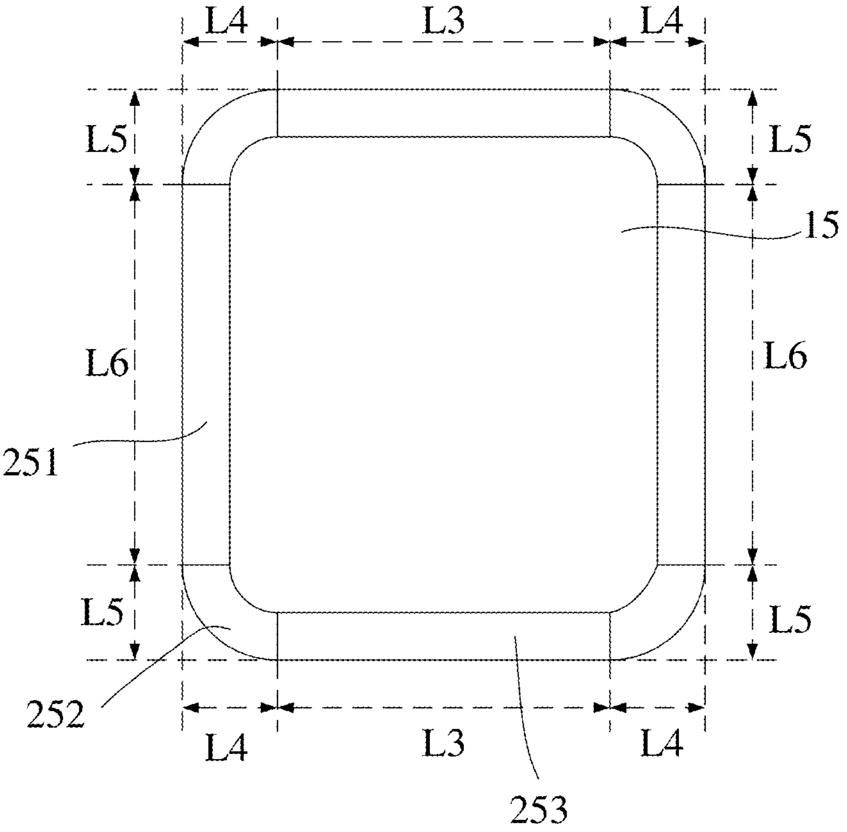
FIG. 3 is a first schematic view of a cover plate provided by an embodiment of the present disclosure.

Specifically, referring to FIG. 3, taking that a cross-section of the cover plate refers to a rounded rectangle as an example, a length L6 of the first portion 251 of the cover plate 15 is greater than or equal to a width L3 of a third portion 253, the width L3 of the third portion 253 is greater than a length L4 of the second portion 252, and the length L4 of the second portion 252 is greater than or equal to a width L5 of the second portion 252.

Figure 4:
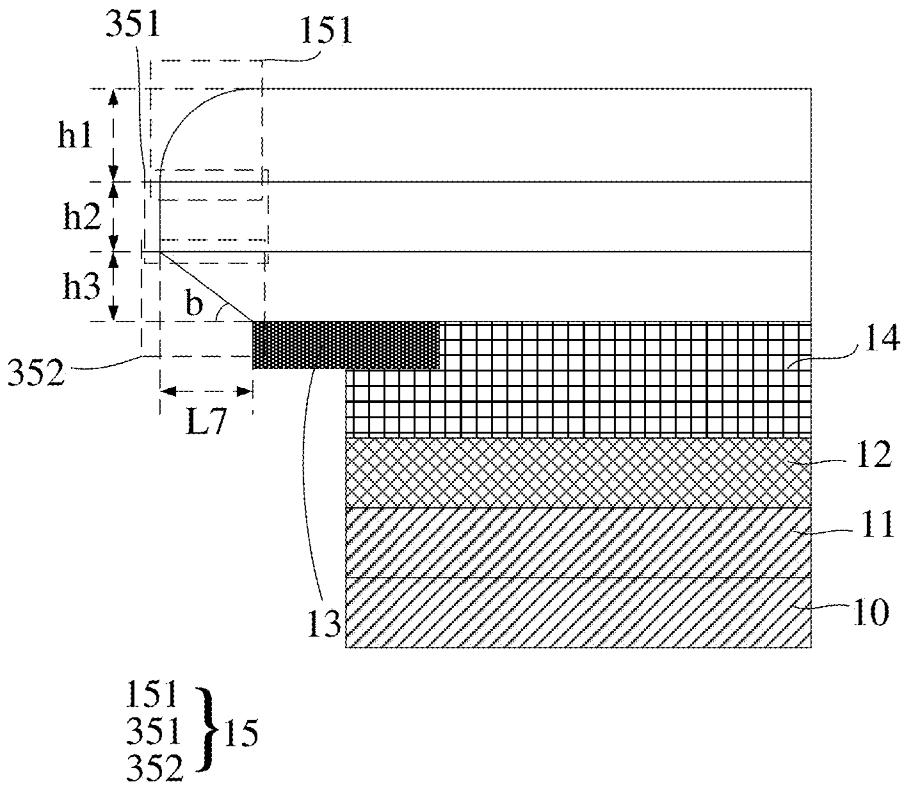
FIG. 4 is a third schematic view of the display device provided by an embodiment of the present disclosure.

In an embodiment, referring to FIG. 4, a side of the cover plate 15 away from the display area 162 further includes a right angle portion 351 and a corner cutting portion 352. The corner cutting portion 352 is disposed between the curved portion 151 and the light-emitting layer 11, and the right angle portion 351 is disposed between the corner cutting portion 352 and the curved portion 151. One boundary of the corner cutting portion 352 is aligned with a boundary of the light-shielding portion away from the display area 162, another boundary of the corner cutting portion 352 is aligned with a boundary of the right angle portion 351, and the boundary of the right angle portion 351 is aligned with a boundary of the curved portion 151 away from the display area 162. By making the cover plate include the curved portion, the right angle portion and the corner cutting portion, the curved portion could adjust a angle of light emission, achieving a borderless display effect of the display device. By setting the corner cutting portion, the cover plate and the lower film layer may have a good adhesion effect. By setting the right angle portion, the transition between the curved portion and the corner cutting portion is carried out, reducing the difficulty of the process.

Figure 7:
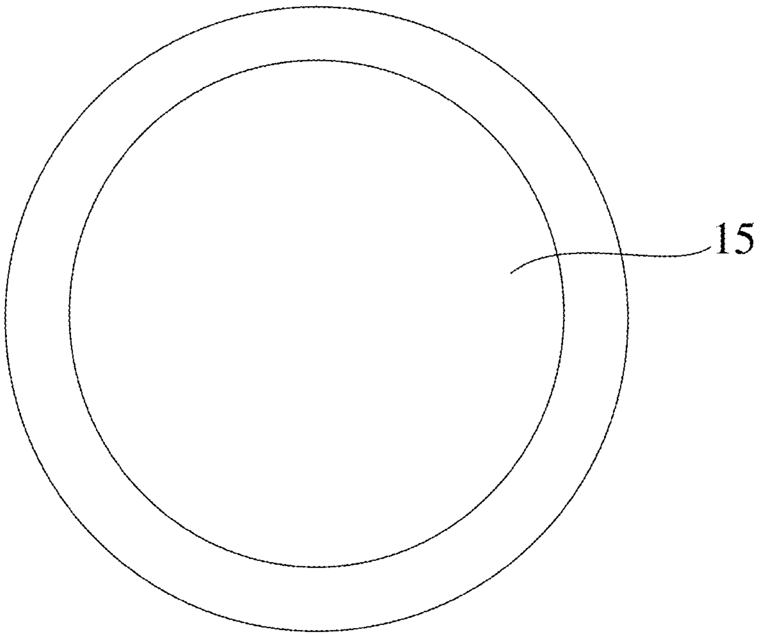
FIG. 7 is a second schematic view of the cover plate provided by an embodiment of the present disclosure.

In an embodiment, referring to FIG. 7, a thickness h1 of the curved portion 151 is greater than a thickness h2 of the right angle portion 351, and the thickness h2 of the right angle portion 351 is greater than a thickness h3 of the corner cutting portion 352. By making the thickness of the curved portion greater than the thickness of the right angle portion, there is a sufficient thickness for the curved portion to adjust the curvature radii of the first and second curved portions, so that light may be emitted from the front and side areas of the non-display area, achieving the visual effect of borderless display. The corner cutting portion needs to form a chamfer to facilitate fitting with the lower film layer. Therefore, it may make the thickness of the corner cutting portion less than the thickness of the right angle portion.

Specifically, the thickness of the cover plate ranges from 0.6 mm to 2 mm. By adjusting the thickness of the cover plate ranging from 0.6 mm to 2 mm, the cover plate has sufficient thickness to adjust the angle of light emission, achieving a borderless display effect of the display device, and avoiding the thickness and weight of the display device being too large due to a large thickness of the cover plate.

Specifically, referring to FIG. 4, an edge of the light-shielding portion 131 is aligned with an edge of the corner cutting portion 352, and the width L7 of the corner cutting portion 352 is less than or equal to 0.1 millimeters. An angle b of the corner cutting portion ranges from 30 degrees to 60 degrees.

Specifically, taking the cover plate including the curved portion, right angle portion and corner cutting portion as an example, the above embodiments provides a detailed explanation, but the embodiments of the present disclosure are not limited to this. For example, in order to reduce a curvature of the cover plate, the right angle portion may be removed, so that the cover plate only includes the curved portion and the corner cutting portion.

In an embodiment, a width of the light-shielding layer is greater than a width of the non-display area. By making the width of the light-shielding layer greater than the width of the non-display area, the problem of side light leakage in the display device caused by the width of light-shielding layer being too small could be solved. For the display device with the width of the light-shielding layer greater than the width of the non-display area, the curvature radius of a part of the cover plate located in the non-display area could be adjusted to emit light from the front and side areas of the cover plate, to achieve a borderless visual effect for both the front and side views of the display device.

Figure 5:
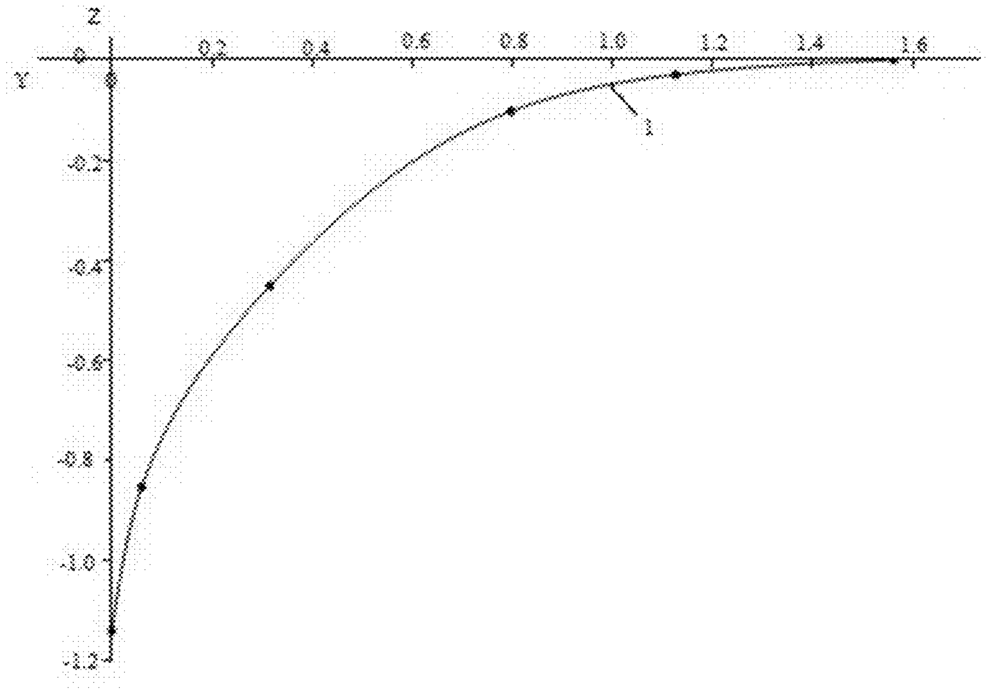
FIG. 5 is a curve diagram of the cover plate located in the curved area provided by an embodiment of the present disclosure.
Figure 6:
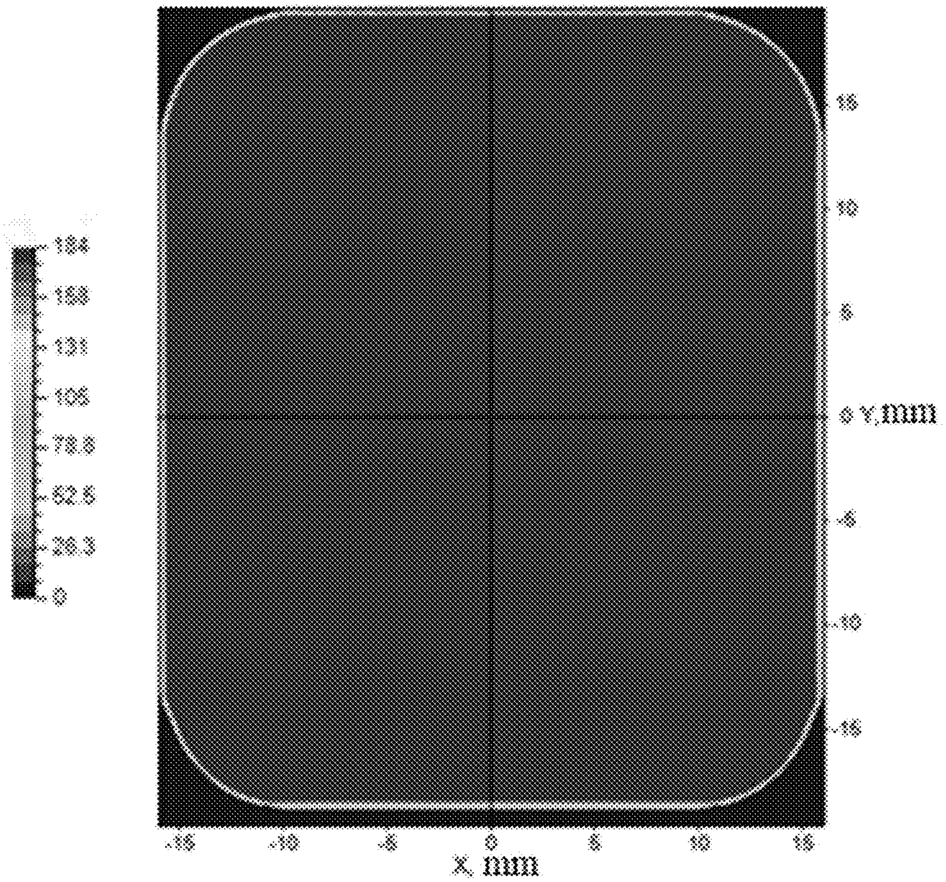
FIG. 6 is a simulation diagram of brightness of the display device provided by an embodiment of the present disclosure.

Specifically, taking the display device shown in FIG. 1 as an example, a shape of the curved portion of the cover plate is shown in FIG. 5, a Y-axis refers to a width of the cover plate in millimeters, a Z-axis refers to a thickness of the cover plate in millimeters, and an arc of the curved portion of the cover plate is shown in a curve 1 of FIG. 1. A curvature radius of the curve 1 ranges from 0.281 millimeters to 1.668 millimeters. By a simulating test for the display device, simulation results shown in FIG. 6 are obtained, an X-axis refers to a transverse direction of the cover plate, and a Y-axis refers to a longitudinal direction of the cover plate. Among them, a light colored part (i.e. a rounded rectangle in FIG. 6) represents the highest brightness, while dark colored parts (i.e. parts outside the rounded rectangle in FIG. 6) represents the lowest brightness. Referring to FIG. 6, it could be obtained that the lowest brightness of four edge areas with of the display device is almost zero. Except for the relatively low brightness on four corners of the edge areas, the brightness of each border of the display device is consistent, thus achieving a borderless display effect.

In an embodiment, a cross-sectional shape of the cover plate includes a trapezoid. For a circular design of the cover plate, and the cross-sectional shape of the cover plate is trapezoidal, when extending toward the display area, the first virtual normal line perpendicular to the curved surface where the first point located may not intersect with the light-shielding portion adjacent to the first point, and intersect with the display area. So that there is light emission in both the front and side areas of corresponding to light-shielding layer, so that when viewing the display device in the front or side view angel, users could achieve the experience with narrower or borderless borders.

Specifically, referring to FIG. 7, when the cross-sectional shape of the cover plate 15 is circular, the longitudinal section of the cover plate 15 may be trapezoidal. It is also possible to design curved portion of the cover plate so that directions of the light emitted from different points are different, and some of the light could be emitted from the front area of the cover plate, while some of the light could be emitted from the side area of the cover plate, thus achieving a borderless display effect of the display device.

In an embodiment, a material of the light-shielding layer includes an ink.

In an embodiment, the light-emitting layer includes a pixel electrode layer, a pixel definition layer, a luminescent material layer, and a common electrode layer.

In an embodiment, the display device further includes an encapsulation layer.

In an embodiment, referring to FIG. 1, the display device 1 further includes a polarizer 12.

Furthermore, the display apparatus is provided by the embodiments of the present disclosure. The display apparatus includes the display device as described in any of the above embodiments and electronic components.

According to the above embodiments, it could be obtained that:

the display device and the display apparatus are provided by the embodiments of the present disclosure, the display device includes the display area and the non-display area disposed on at least one side of the display area, the display device further includes the substrate, the light-emitting layer, the light-shielding layer, and the cover plate, the light-emitting layer is disposed on one side of the substrate and includes the plurality of light-emitting pixels corresponding to the display area, the light-shielding layer is disposed on the side of the light-emitting layer away from the substrate and includes the light-shielding portion at least corresponding to the non-display area, and the cover plate is disposed on the side of the light shielding layer away from the substrate and includes at least a curved portion corresponding to the non-display area; the surface of the curved portion includes the first point; when the first virtual normal line perpendicular to the surface of the curved portion where the first point is located extends toward the display area, the first virtual normal line does not intersect with the light-shielding portion adjacent to the first point and intersects with the display area, therefore, when light emitted by a luminous pixel located between the first virtual normal line and the light-shielding portion adjacent to the first virtual normal passes through the first point, the light emitted by the luminous pixel may deflect towards the display area, making the non-display area have a same forward light output as the display area, which allows users to have a reduced or even borderless visual experience when facing the display device.

In the foregoing embodiments, the description of each of the embodiments has respective focuses. For a part that is not described in detail in an embodiment, reference may be made to relevant descriptions in other embodiments.

The display device provided in the embodiments of the present disclosure is described in detail above. The principle and implementations of the present disclosure are described in this specification by using specific examples. The description about the foregoing embodiments is merely provided to help understand the technical solution and core ideas of the present disclosure. Persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A display device, comprising a display area and a non-display area disposed on at least one side of the display area, wherein the display device further comprises:

a substrate;

a light-emitting layer disposed on a side of the substrate, the light-emitting layer comprising a plurality of light-emitting pixels corresponding to the display area;

a light-shielding layer disposed on a side of the light-emitting layer away from the substrate, the light-shielding layer comprising a light-shielding portion at least corresponding to the non-display area; and a cover plate disposed on a side of the light-shielding layer away from the substrate, the cover plate comprising a curved portion at least corresponding to the non-display area;

wherein a surface of the curved portion comprises a first point, when a first virtual normal line defined as perpendicular to a surface of the curved portion where the first point is located extends toward the display area, the first virtual normal line does not intersect with the light-shielding portion adjacent to the first point and intersects with the display area; an orthographic projection of the curved portion onto the light-shielding layer is contained within the light-shielding portion in the light-shielding layer.

2. The display device of claim 1, wherein the surface of the curved portion further comprises a second point, when a second virtual normal line defined as perpendicular to a surface of a curved portion where the second point is located extends toward the display area, the second virtual normal line does not intersect intersects with the light-shielding portion adjacent to the second point, and the first point is closer to the display area compared to the second point.

3. The display device of claim 2, wherein the curved portion corresponding to the first point is provided with a first curvature radius, the curved portion corresponding to the second point is provided with a second curvature radius, and the first curvature radius is smaller than the second curvature radius.

4. The display device of claim 3, wherein a first distance is defined from the first point to an adjacent boundary of the display area, a second distance is defined from a boundary of the curved portion where the first point is located and away from the display area to the adjacent boundary of the display area, and a ratio between the first distance and the second distance ranges from one-third to one-half.

5. The display device of claim 1, wherein the surface of the curved portion further comprises a third point, when a third virtual normal line defined as perpendicular to a surface of a curved portion where the third point is located extends toward the display area, the third virtual normal line intersects with a boundary of the light-shielding portion adjacent to the third point and close to the display area, and intersects with the display area; and the first point is closer to the display area compared to the third point.

6. The display device of claim 1, wherein the display device further comprises an adhesive layer which is disposed between the light-emitting layer and the cover plate, a refractive index of the adhesive layer is lower than a refractive index of the cover plate, and the refractive index of the cover plate ranges from 1.5 to 2.

7. The display device of claim 1, wherein the curved portion comprises a first portion close to the display area and a second portion away from the display area, a boundary between the first portion and the second portion passes through the first point and is parallel to a boundary of the curved portion close to the display area, and a ratio of a surface area of the first portion to a surface area of the curved portion ranges from one-third to one-half.

8. The display device of claim 1, wherein a cross-sectional shape of the cover plate comprises a trapezoidal shape.

9. A display apparatus comprising a display device and an electronic component, the display device comprising a display area and a non-display area disposed on at least one side of the display area, wherein the display device comprises:

a substrate;

a light-emitting layer disposed on a side of the substrate, the light-emitting layer comprising a plurality of light-emitting pixels corresponding to the display area;

a light-shielding layer disposed on a side of the light-emitting layer away from the substrate, the light-shielding layer comprising a light-shielding portion at least corresponding to the non-display area; and a cover plate disposed on a side of the light-shielding layer away from the substrate, the cover plate comprising a curved portion at least corresponding to the non-display area;

wherein, a surface of the curved portion comprises a first point, when a first virtual normal line defined as perpendicular to a surface of a curved portion where the first point is located extends toward the display area, the first virtual normal line does not intersect with the light-shielding portion adjacent to the first point and intersects with the display area; an orthographic projection of the curved portion onto the light-shielding layer is contained within the light-shielding portion in the light-shielding layer;

wherein the surface of the curved portion comprises a second point, when a second virtual normal line defined as perpendicular to a surface of a curved portion where the second point is located extends toward the display area, the second virtual normal line intersects with the light-shielding portion adjacent to the second point, and the first point is closer to the display area compared to the second point;

wherein the curved portion corresponding to the first point is provided with a first curvature radius, the curved portion corresponding to the second point is provided with a second curvature radius, and the first curvature radius is less than the second curvature radius;

wherein a first distance is defined from the first point to an adjacent boundary of the display area, a second distance is defined from a boundary of the curved portion where the first point is located at and away from the display area to the adjacent boundary of the display area, and a ratio between the first distance and the second distance ranges from one-third to one-half.

10. The display apparatus of claim 9, wherein the surface of the curved portion comprises a third point, when a third virtual normal line defined as perpendicular to a surface of a curved portion where the third point is located extends toward the display area, the third virtual normal line intersects with a boundary of the light-shielding portion adjacent to the third point and close to the display area, and intersects with the display area; and the first point is closer to the display area compared to the third point.

11. The display apparatus of claim 9, wherein a side of the cover plate away from the display area comprises a right angle portion and a corner cutting portion, the corner cutting portion is disposed between the curved portion and the light-emitting layer, the right angle portion is disposed between the corner cutting portion and the curved portion, one boundary of the corner cutting portion is aligned with a boundary of the light-shielding portion away from the display area, another boundary of the corner cutting portion is aligned with a boundary of the right angle portion, and the boundary of the right angle portion is aligned with a boundary of the curved portion away from the display area.

12. The display apparatus of claim 11, wherein a thickness of the curved portion is greater than a thickness of the right angle portion, and the thickness of the right angle portion is greater than a thickness of the corner cutting portion.

13. The display apparatus of claim 9, wherein the display device comprises an adhesive layer which is disposed between the light-emitting layer and the cover plate, a refractive index of the adhesive layer is lower than a refractive index of the cover plate, and the refractive index of the cover plate ranges from 1.5 to 2.

14. The display apparatus of claim 9, wherein the curved portion comprises a first portion close to the display area and a second portion away from the display area, a boundary between the first portion and the second portion passes through the first point and is parallel to a boundary of the curved portion close to the display area, and a ratio of a surface area of the first portion to a surface area of the curved portion ranges from one-third to one-half.

15. The display apparatus of claim 9, wherein a cross-sectional shape of the cover plate comprises a trapezoidal shape.

* * * * *